Jan. 27, 1959  R. R. HUNT  2,870,735
PERMIT SYSTEM FOR PARKING AUTOMOBILES
Filed March 23, 1956  2 Sheets-Sheet 1
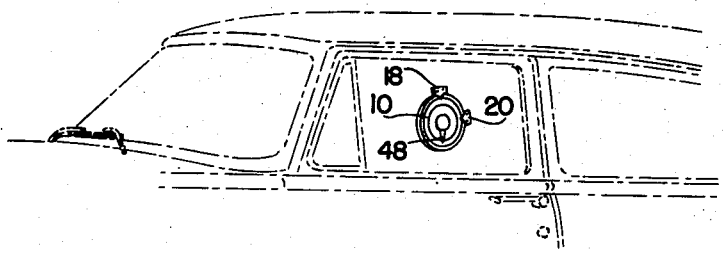
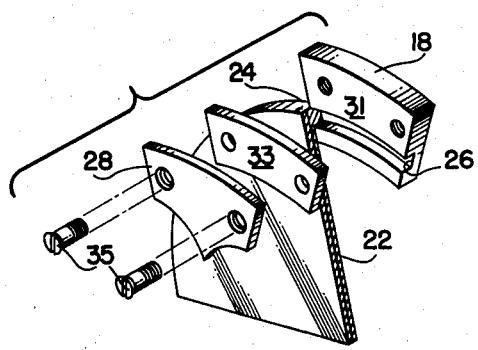
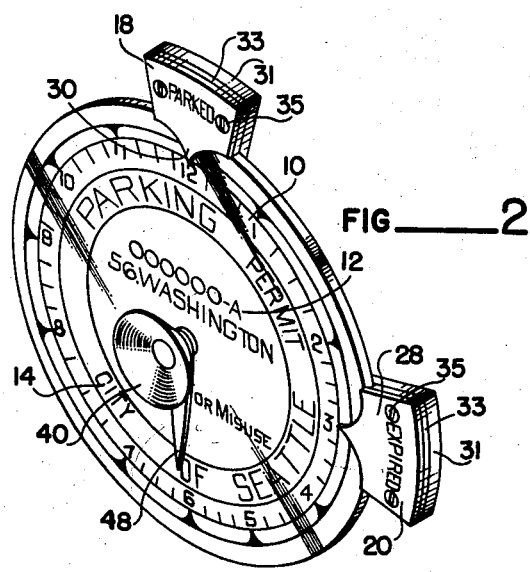
REGINALD R. HUNT
*INVENTOR.*
BY Jan. 27, 1959

R. R. HUNT 2,870,735

PERMIT SYSTEM FOR PARKING AUTOMOBILES

Filed March 23, 1956

REGINALD R. HUNT
INVENTOR.

BY
*Smith & Tuck*

United States Patent Office 2,870,735
Patented Jan. 27, 1959

2,870,735

PERMIT SYSTEM FOR PARKING AUTOMOBILES

Reginald R. Hunt, Seattle, Wash.

Application March 23, 1956, Serial No. 573,528

1 Claim. (Cl. 116—133)

This present invention relates to the general field of automobile parking devices and, more particularly, to a method and means for licensing the parking of automobiles on a long term basis, as by the year, in a definite community. Further, in order to implement the method an indicating device is provided to the end that law enforcement officers will have visual evidence of the fact that the automobile is licensed to park in the vicinity and, secondly; that it has not abused the time limits for the parking previously arranged for under the permit.

The principal object of my present invention, therefore, is to provide a method of licensing the parking rights of automobiles for given areas or for use within a political sub-division whereby an annual license fee is collected in advance for certain defined parking privileges within a given district.

A further object of this present invention is to provide a mechanical means of simple construction and low cost which can be issued as part of the license consideration, and which will be retained by the automobile owner to identify him as a privileged parker and at the same time to provide means so that he himself will assist the law enforcement agency in regulating his use of the parking facilities and will not be in a position to take so much parking time in any one area as to inconvenience other persons who also need to park in similar positions.

A further object of this present invention is to provide a method and means which will eliminate the penalizing of the parking space user who does not have the exact change required by the parking meters, now so commonly employed.

A further object of this present invention is to provide a method for controlling of parking of automobiles which will supply adequate regulatory control of parking in communities whose need is not sufficient to justify the large expense entailed in the installation of the conventional parking meter.

Further objects, advantages and capabilities will be apparent from the description and disclosure in the drawings, or may be comprehended or are inherent in the device.

In the drawings:

Figure 1 is a perspective view illustrating a portion of an automobile and showing my parking indicating device in place thereon;

Figure 2 is a perspective enlarged view showing my parking device;

Figure 6 is an exploded fragmentary view showing the construction of the time indicator.

Figure 3:
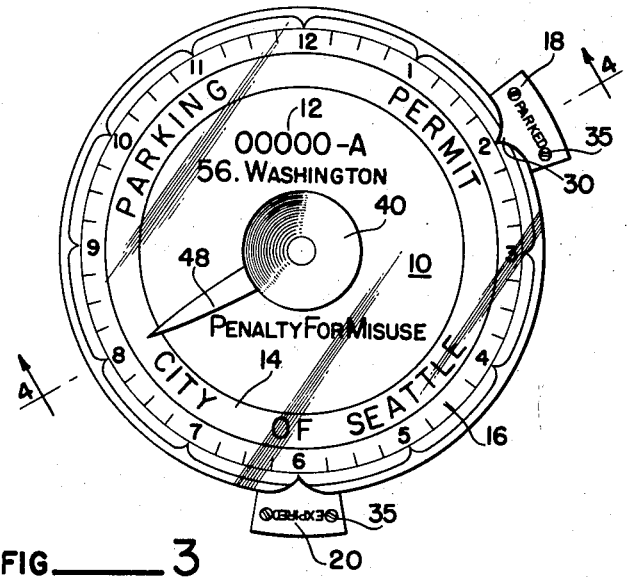
Figure 3 is an enlarged front face view of my device for indicating an authorized parking permit.
Figure 4:
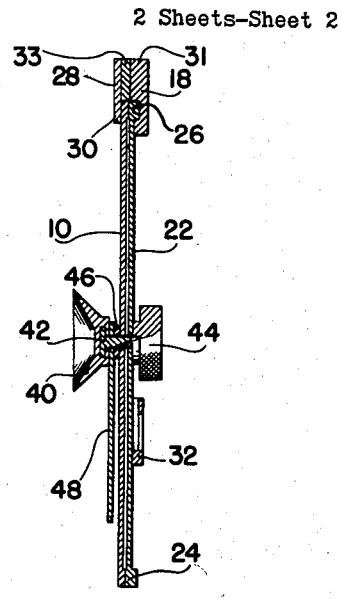
Figure 4 is a cross sectional view taken along the line 4—4 of Figure 3.

Referring more particularly to the disclosure in the drawings, the numeral 10 designates the face plate of my device for indicating the proper licensing of the individual car and secondly; giving a visual indication of the time the car was parked, and in certain instances the time that, in that particular locality, the parking time will have run out. This plate will normally carry the license number, as indicated at 12, and would indicate in the circle, as 14, the political sub-division which has issued the parking permit. Preferably concentrically disposed is a time dial, as 16, divided into increments of fifteen minutes so that the time parked indicator as 18, can be positioned with reasonable accuracy at the designated time the car was parked. This indicator together with the indicator indicating the expired time, as 20, are slidably disposed upon the rim of the parking device.

Figure 5:
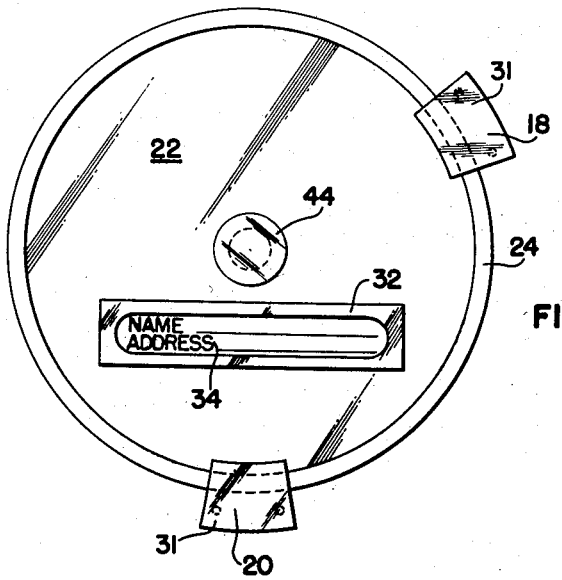
Figure 5 is a rear face view of the device shown in Figure 3 with certain movable parts shifted.

The front plate 10 is positioned upon the base plate 22. This plate is preferably of substantial construction and forms the base of the unit to which the properly engraved front plate 10 is secured at the time the permit is issued. Base plate 22 is provided with a substantial overhanging rim 24, which in turn provides means so that by having the sliders as 18 and 20 provided with arcuate grooves, as at 26, and an overlapping pointer face plate, as 28. The sliders are held to the rim and may be slid clear around the same to the desired time marking. The sliders are preferably provided with a downwardly extending pointer as 30, so that it can be set at least as closely as a quarter hour to the time desired. The sliders are preferably made up after the showing of Figure 6. In addition to pointer face plate 28, a groved base plate 31 is employed and a spacer plate 33 positioned between them. Suitable means as screws 35 hold the three pieces in operational position. Base plate 22 is provided with a housing 32, on its exposed or rear face, adapted to receive a card suitably embossed or engraved with the name and address of the licensee. This blank card is indicated at 34 in Figure 5.

In use, the device is held in place by a vacuum cup means 40. This cup is suitably secured at the center of plates 10 and 22 on the viewing side of the device, as by an imbedded screw 42 and is locked in place by, preferably, a knurled nut, as 44, which is located on the rear face of plate 22. Disposed on screw 42 under vacuum cup 40 and spaced from dial 10 as by washer 46 is a time pointer 48. This pointer may be employed to set actual minutes with reasonable accuracy if it is considered that dial 16 would comprise sixty minutes. The manner of using this device is illustrated in Figure 1, where it will be observed that the device is applied to the inside surface of the car window by means of the vacuum cup 40 and is thus protected against tampering or theft.

In putting my method into use it, of course, will entail referring back to the zoning laws with which most political sub-divisions are now implemented. This is necessary because this equipment is, in effect, a law enforcement aid and must be fully protected by law or it could easily fall into abuse which would nullify its effectiveness. In putting the equipment actually to use then, the driver of the vehicle would make application to the license department of the political sub-division with which he is concerned, and for a fee, to be determined by the proper authority. he would then procure a license to park anywhere within the parking areas of that political sub-division whether it was equipped with parking meters, or not.

This device, it is thought, might be issued yearly for a fee, pro-rated in respect to the particular use to which the permit is issued. For instance, business men, salesmen and people who regularly park several times daily throughout the day, should be required to pay more for parking privileges than a person whose parking was limited to one or two times daily.

Since every street, avenue and thoroughfare in our populated areas is subject to some zoning laws, it can be quite logically expected that all drivers of vehicles at some time or other will come within the parking ordinances of the area and be subject to such privileges as this device would afford.

The advantages of this method and the means complementing the same is that the political sub-division or community would immediately have a source of revenue, for the use of its streets without making a very substantial investment in parking meters or going to the considerable expense of maintaining law enforcement officers for the purpose of merely preventing mis-use of the streets without the revenue which is so desirable, particularly in new communities.

It is to be contemplated that the implementing device which is illustrated in the accompanying drawings can be made very inexpensively, it lends itself very easily to metal stampings or plastic molding constructions so that the device itself would represent only a matter of a few cents of expense and would immediately be issued to the person licensed as part of the consideration. Investigations and studies made by well advised traffic control people indicates that in the majority of communities a ten dollar yearly fee would not be exorbitant and this can easily accumulate to a very substantial revenue. The use of this equipment takes care of the driver embarrassment proposition so generally current, in which most every driver of a motor vehicle has experienced the present day parking meter hazard, namely; being caught without the necessary coin and then being forced to take the risk of procuring change, only to find many times that on his return that the traffic officer has imposed the customary fine for an offense not wholly justified. Such impositions, which certainly is quite contrary to good public relations, is entirely eliminated with this device. This equipment has further advantages that instead of the political sub-division being required to service and repair the parking meters as they become damaged, with this plan every vehicle owner, without cost to the licensee agency, will own and be responsible for the maintenance of his own private parking meter.

It is believed that it will be clearly apparent from the above description and the disclosure in the drawings that the invention comprehends a novel construction of a permit system for parking automobiles.

Having thus disclosed my invention, I claim:

A parking time indicator to be positioned within a vehicle in externally visible position, comprising: a disc shaped body formed by a face plate and a base plate secured together in aligned and abutted position, said face plate having identification indicia thereon indicating the vehicle license number and the political division with which the indicator is associated and having time dial indicia radially disposed indicating the hours and parts thereof, a vacuum cup centrally disposed on said face plate and adapted to be secured to the inside of a vehicle window thereby displaying said face plate, said vacuum cup being secured to said body by a screw embedded therein and extending through said body and a manually adjustable knurled nut on the end of said screw to press on said base plate to secure the assembly together and a minute indicating pointer mounted on said screw to be located by the motorist in position indicating parts of an hour in the manner of the minute hand on a clock and said pointer being secured in adjusted position by said nut, said base plate having a rim overhanging its rear face and a pair of sliders each having a rear portion with an arcuate groove fitting said rim and abutting the rear face of said base plate and having an overlapping front portion abutting the front face of said face plate whereby said sliders are slidable about the perimeter of said body, and said sliders having pointers on said front portion reading on said time dial, one slider being marked as indicating the time the vehicle was parked and the other slider being marked as indicating the time at which permissible parking expires.

References Cited in the file of this patent

UNITED STATES PATENTS

| 1,124,234 | Anderson | Jan. 5, 1915 |
| 1,853,580 | Sandow | Apr. 12, 1932 |
| 2,201,941 | Behr | May 21, 1940 |
| 2,681,633 | Basso | June 22, 1954 |

FOREIGN PATENTS

| 246,221 | Switzerland | Sept. 1, 1947 |
| 1,037,239 | France | Apr. 29, 1953 |